(12) United States Patent
Wang et al.

(10) Patent No.: US 12,554,389 B2
(45) Date of Patent: Feb. 17, 2026

(54) INTERACTIVE CONTENT GENERATION METHOD AND APPARATUS, AND STORAGE MEDIUM AND ELECTRONIC DEVICE

(71) Applicant: BEIJING YOUZHUJU NETWORK TECHNOLOGY CO., LTD., Beijing (CN)

(72) Inventors: Hui Wang, Beijing (CN); Chunyang Zhu, Beijing (CN); Yufei Wang, Beijing (CN); Hongzhang Li, Beijing (CN); Yang Li, Beijing (CN); Sihui Chen, Beijing (CN); Han Xue, Beijing (CN); Zijun Wu, Beijing (CN); Jiahong Chen, Beijing (CN); Tao Deng, Beijing (CN); Zihao Chen, Beijing (CN); Shengyan Shi, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 329 days.

(21) Appl. No.: 18/552,612

(22) PCT Filed: Apr. 13, 2022

(86) PCT No.: PCT/CN2022/086503
§ 371 (c)(1),
(2) Date: Sep. 26, 2023

(87) PCT Pub. No.: WO2022/228118
PCT Pub. Date: Nov. 3, 2022

(65) Prior Publication Data
US 2024/0184438 A1 Jun. 6, 2024

(30) Foreign Application Priority Data
Apr. 29, 2021 (CN) .................. 202110474918.X

(51) Int. Cl.
*G06F 3/04847* (2022.01)

(52) U.S. Cl.
CPC ................ *G06F 3/04847* (2013.01)

(58) Field of Classification Search
None
See application file for complete search history.

(56) References Cited

U.S. PATENT DOCUMENTS

2009/0253517 A1* 10/2009 Bererton ............... A63F 13/71
463/43
2017/0364209 A1* 12/2017 Cheng ............... G06F 3/04845
2020/0174755 A1* 6/2020 Rose .................. G06F 8/35

FOREIGN PATENT DOCUMENTS

CN 101699452 A 4/2010
CN 107463584 A 12/2017
(Continued)

OTHER PUBLICATIONS

Notification of Grant of Patent Right for Invention issued Jul. 21, 2023 in CN Appl. No. 202110474918.X, English translation (6 pages).
(Continued)

*Primary Examiner* — Tuan S Nguyen

(57) ABSTRACT

The present disclosure relates to an interactive content generation method and apparatus, and a storage medium and an electronic device. The method includes: displaying a content editing interface, wherein the content editing interface includes a canvas area, a material area and an interaction event area; displaying a target interactive scene image corresponding to a scene adding operation in the canvas area in response to the scene adding operation performed by a user in the content editing interface; adding, in response to a selection operation for a target material in the material area performed by the user, the target material to the target interactive scene image, and adding, in response to an (Continued)

interaction event configuration operation for the target material performed by the user in the interaction event area, an interaction event to the target material to obtain target interactive content.

20 Claims, 4 Drawing Sheets

(56) References Cited

FOREIGN PATENT DOCUMENTS

| | | |
|---|---|---|
| CN | 108428159 A | 8/2018 |
| CN | 109375916 A | 2/2019 |
| CN | 111259644 A | 6/2020 |
| CN | 111367447 A | 6/2020 |
| CN | 111790158 A | 10/2020 |
| CN | 111803951 A | 10/2020 |
| CN | 113190314 A | 7/2021 |

OTHER PUBLICATIONS

International Search Report and Written Opinion issued Jun. 22, 2022 in PCT/CN2022/086503, English translation (16 pages).
First Office Action issued Dec. 13, 2022 in CN Appl. No. 202110474918.X, English translation (14 pages).
Second Office Action issued Apr. 14, 2023 in CN Appl. No. 202110474918.X, English translation (13 pages).

* cited by examiner

ND APPARATUS, AND STORAGE
INTERACTIVE CONTENT GENERATION METHOD AND APPARATUS, AND STORAGE MEDIUM AND ELECTRONIC DEVICE

CROSS-REFERENCE TO RELATED APPLICATIONS

The present application is a U.S. National Stage Application under 35 U.S.C. § 371 of International Patent Application No. PCT/CN2022/086503, filed on Apr. 13, 2022, which claims priority to China Patent Application No. 202110474918.X filed on Apr. 29, 2021, the disclosure of both of which are incorporated by reference herein in entirety.

TECHNICAL FIELD

The present disclosure relates to an interactive content generation method, apparatus, storage medium, and electronic device.

BACKGROUND

Interactive content, as an emerging type of content, may display an interaction result based on the user's interactive operation on an interactive page, or display a new interaction result based on user's further interaction operation on the interaction result, and so on, to achieve complex interaction with the user. The main form of interactive content comprise an H5 landing page, an interactive part in a page, etc., comprising an interactive video, an interactive game, etc.

SUMMARY

This summary is provided for a concise introduction of the concept of the present disclosure, which will be described in detail in the detailed description below. This summary is not intended to identify critical features or essential features of the claimed technical solution, nor is it intended to be used to limit the scope of the claimed technical solution.

In a first aspect, the present disclosure provides an interactive content generation method, comprising: displaying a content editing interface, wherein the content editing interface comprises a canvas area, a material area, and an interaction event area, the material area being configured to display different types of preset materials, and the interaction event area being configured to configure an interaction event for a material displayed on an interactive scene image; displaying a target interactive scene image corresponding to a scene adding operation in the canvas area in response to the scene adding operation performed by a user in the content editing interface; and adding, in response to a selection operation for a target material in the material area performed by the user, the target material to the target interactive scene image, and adding, in response to an interaction event configuration operation for the target material performed by the user in the interaction event area, an interaction event to the target material to obtain target interactive content.

In a second aspect, the present disclosure provides an interactive content generation apparatus, comprising: a first display module configured to display a content editing interface, wherein the content editing interface comprises a canvas area, a material area, and an interaction event area, the material area being configured to display different types of preset materials, and the interaction event area being configured to configure an interaction event for a material displayed on an interactive scene image; a second display module configured to display a target interactive scene image corresponding to a scene adding operation in the canvas area in response to the scene adding operation performed by a user in the content editing interface; and a configuration module configured to add, in response to a selection operation for a target material in the material area performed by the user, the target material to the target interactive scene image, and add, in response to an interaction event configuration operation for the target material performed by the user in the interaction event area, an interaction event to the target material to obtain target interactive content.

In a third aspect, the present disclosure provides a non-transitory computer-readable medium having a computer program stored thereon, wherein the computer program, when executed by a processing device, implements the method described in the first aspect.

In a fourth aspect, the present disclosure provides an electronic device, comprising: a storage device having a computer program stored thereon; and a processing device configured to execute the computer program in the storage device to implement the method described in the first aspect.

In a fifth aspect, the present disclosure provides a computer program, comprising: instructions that, when executed by a processor, cause the processor to perform the method described in the first aspect of the present disclosure.

In a sixth aspect, the present disclosure provides a computer program product comprising instructions that, when executed by a processor, cause the processor to perform the method described in the first aspect of the present disclosure.

Other features and advantages of the present disclosure will be explained in detail in the subsequent specific embodiments.

BRIEF DESCRIPTION OF THE DRAWINGS

The above and other features, advantages, and aspects of the embodiments of the present disclosure will become more apparent from the following embodiments with reference to the drawings. Throughout the drawings, the same or similar reference signs indicate the same or similar elements. It should be understood that the drawings are schematic and the components and elements are not necessarily drawn to scale. In the drawings.

DETAILED DESCRIPTION

Figure 1:
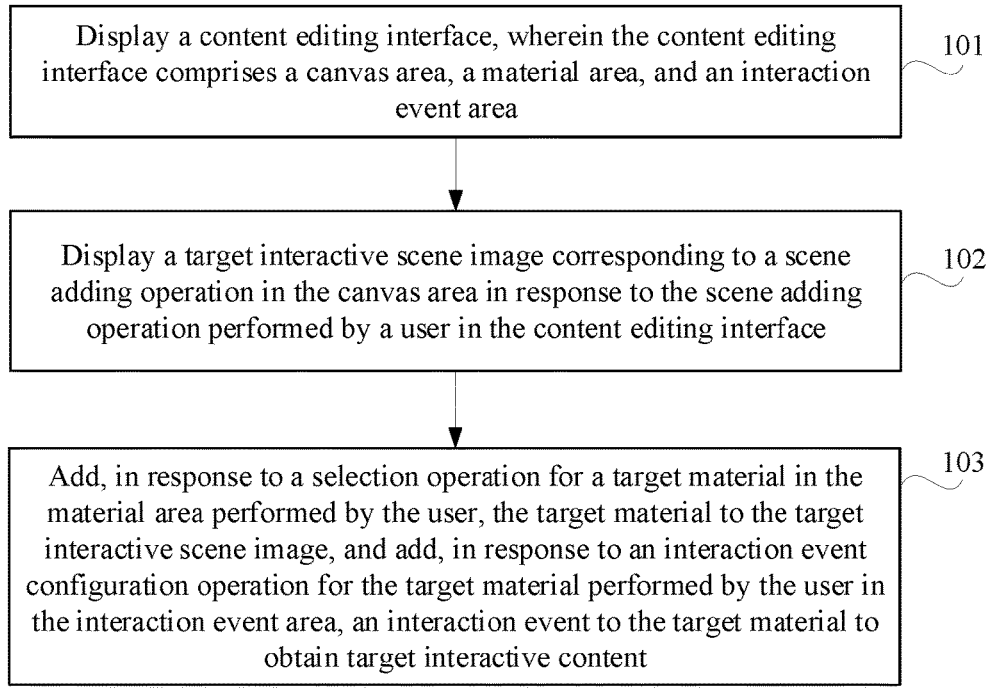
FIG. 1 is a flowchart of an interactive content generation method according to an exemplary embodiment of the present disclosure.

Exemplary embodiments of the present disclosure will now be described in detail with reference to the accompanying drawings. Although some embodiments of the present disclosure are shown, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the methods may comprise additional steps and/or some of the illustrated steps may be omitted. The scope of the present disclosure is not limited in this regard.

The term "comprising" and its variants as used herein is an open-ended mode expression, that is, "comprising but not limited to". The term "based on" means "based at least in part on". The term "one embodiment" means "at least one embodiment"; the term "another embodiment" means "at least one additional embodiment"; and the term "some embodiments" means "at least some embodiments". Related definitions of other terms will be given in the following description.

It should be noted that the concepts of "first" and "second" mentioned in the present disclosure are only used to distinguish different devices, modules or units, and are not used to limit the order of functions performed by these devices, modules or units, or interdependence therebetween. It should be noted that the modifications of "a" and "a plurality of" mentioned in the present disclosure are illustrative and not restrictive, and those skilled in the art should understand that unless clearly indicated in the context, they should be understood as "one or more".

The names of messages or information exchanged between multiple devices in the embodiments of the present disclosure are only used for illustrative purposes, and are not used to limit the scope of these messages or information.

The inventors of the present disclosure have found that in related art, the process of generating interactive content is complex and requires code-based development, therefore requiring a high skill level of a creator and resulting in a high entry barrier. In addition, it requires the creator to combine various materials such as images, video, music, text, etc. through code development, which has a high requirement for logical strictness and has high arrangement complexity, and therefore requires a lot of manpower and time to be invested in the interactive content generation process, which affects the efficiency of interactive content generation.

In view of this, the present disclosure provides a new interactive content generation method, to generate interactive content in a visualized manner without the need for a user to generate interactive content by writing code, thereby reducing the configuration cost during the interactive content generation process and improving the efficiency of interactive content generation.

FIG. 1 is a flowchart of an interactive content generation method according to an exemplary embodiment of the present disclosure. Referring to FIG. 1, the interactive content generation method comprises steps 101 to 103.

In step 101, a content editing interface is displayed, wherein the content editing interface comprises a canvas area, a material area, and an interaction event area. The material area is configured to display different types of preset materials, and the interaction event area is configured to configure an interaction event for a material displayed on an interactive scene image.

In step 102, a target interactive scene image corresponding to a scene adding operation is displayed in the canvas area in response to the scene adding operation performed by a user in the content editing interface.

In step 103, in response to a selection operation for a target material in the material area performed by the user, the target material is added to the target interactive scene image, and in response to an interaction event configuration operation for the target material performed by the user in the interaction event area, an interaction event is added to the target material to obtain target interactive content.

In this way, a content editing interface can be provided to the user, and then the user can add a corresponding interactive scene image in the content editing interface, select a target material and add the target material to the interactive scene image, and then add an interaction event to the target material to obtain the target interactive content. Therefore, instead of writing code to combine various types of materials to generate an interactive content, the user can perform a visualized interactive content editing operation and does not need to generate the interactive content by writing code, thereby reducing the configuration cost in the interactive content generation process and improving the efficiency of interactive content generation.

In order to enable those skilled in the art to better understand the interactive content generation method provided in the present disclosure, each of the steps described above is described in detail by way of example below.

Figure 2:
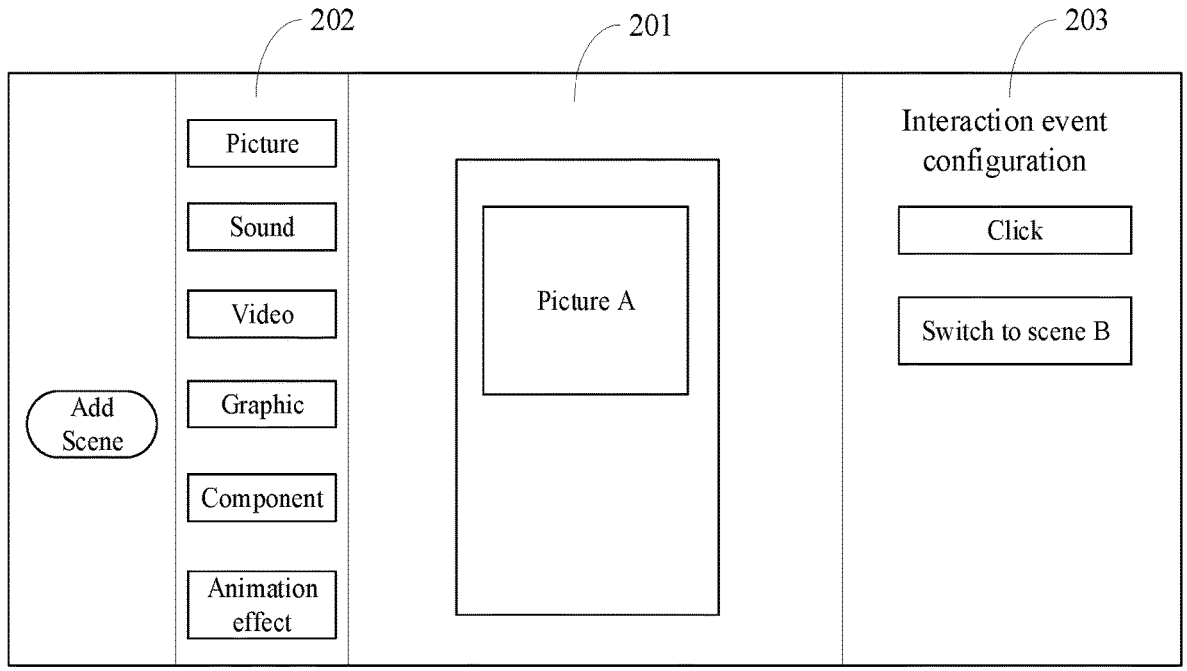
FIG. 2 is a schematic diagram of a content editing interface in an interactive content generation method according to an exemplary embodiment of the present disclosure.

First, it should be understood that the interactive content generation method provided in the present disclosure can be encapsulated as an application program, and the application program is installed on a user terminal after the user downloads the application program. In this case, after the user opens the application program, the content editing interface shown in FIG. 2 can be displayed to the user. Alternatively, the interactive content generation method provided in the present disclosure can be performed online, and after the user accesses to a corresponding website, the content editing interface shown in FIG. 2 is displayed to the user. The embodiment of the present disclosure does not limit the operation scenarios of the interactive content generation method.

Referring to FIG. 2, the content editing interface may comprise a canvas area 201, a material area 202, and an interaction event area 203. On initial display, the canvas area can be displayed empty or display a default interactive scene image as shown in FIG. 2. The material area can display different types of preset materials for user selection. For example, at least one of a picture material, a sound material, a video material, a graphic material, a component material, or an animation effect material can be displayed. The component material may be a material obtained by combining different types of materials, such as pictures, sounds, etc. The animation effect material may be an animation effect material, such as animation effect when pictures are switched. The interaction event area can be configured to configure an interaction event for a material displayed on the interactive scene image. For example, as shown in FIG. 2, if picture A is displayed in the interactive scene image, a configuration can be made in the interaction event area to switch to a specified scene after a user clicks on the picture A. Therefore, the user can combine various types of materials through visualized configuration and add a corresponding interaction events for the materials, without the need for users to generate interactive content through code writing, thereby reducing the configuration cost in the interactive content generation process and improving the efficiency of interactive content generation.

After displaying the content editing interface, in response to a scene adding operation performed by the user in the content editing interface, a target interactive scene image corresponding to the scene adding operation is displayed in the canvas area. For example, referring to FIG. 2, a scene adding control may be displayed in the content editing interface. When a user wants to generate interactive content, the scene adding control can be triggered by a click operation, and then the user is prompted to upload a local interactive scene image. Alternatively, a plurality of preset interactive scene images can be displayed for the user, and an interactive scene image that the user wants to edit is determined from the plurality of interactive scene images according to the user's selection operation on at least one interactive scene image. Thereafter, a corresponding interactive scene image can be displayed in the canvas area, that is, a target interactive scene image corresponding to the scene adding operation is displayed in the canvas area.

In some embodiments, the content editing interface further comprises a scene display area. Accordingly, the displaying of the target interactive scene image corresponding to the scene adding operation in the canvas area in response to the scene adding operation performed by the user in the content editing interface comprises: displaying a plurality of interactive scene images in the scene display area in response to the scene adding operation performed by the user in the content editing interface, and displaying the target interactive scene image in the canvas area in response to a selection operation for the target interactive scene image in the plurality of interactive scene images performed by the user.

Figure 3:
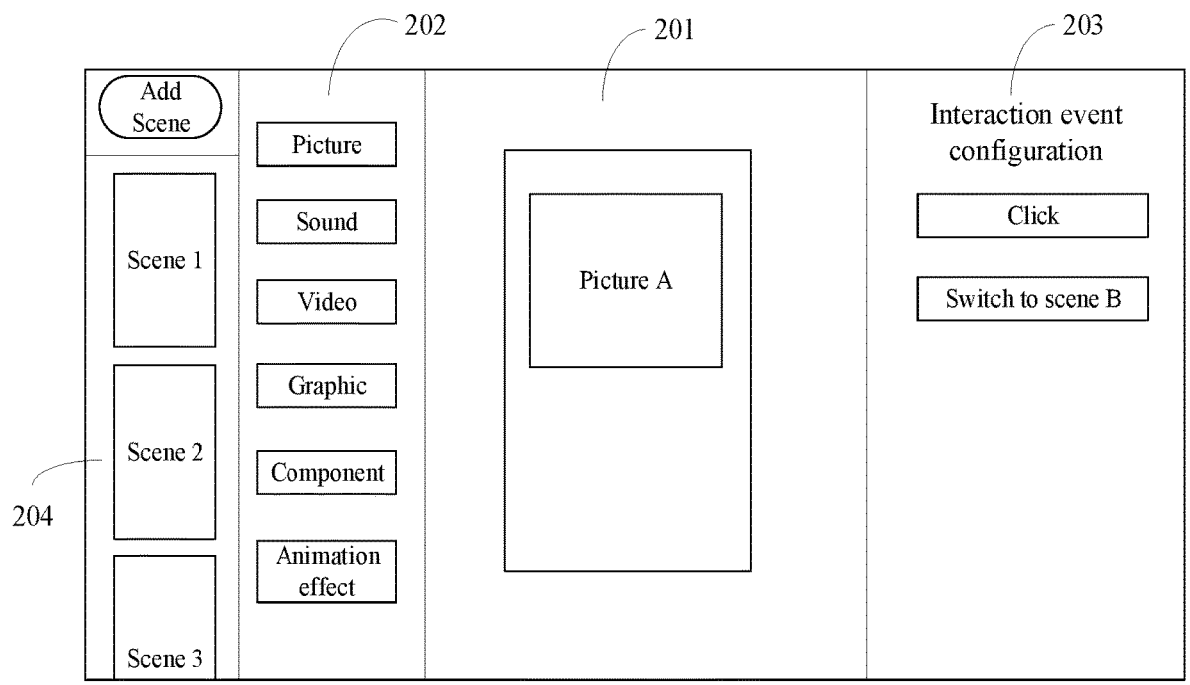
FIG. 3 is a schematic diagram of a content editing interface in an interactive content generation method according to another exemplary embodiment of the present disclosure.

For example, An scene adding control is displayed in the content editing interface. After the user clicks the scene adding control, an upload interface is displayed for the user to upload a local interactive scene image. After the user uploads a plurality of interactive scene images, as shown in FIG. 3, the plurality of interactive scene images can be displayed in a scene display area 204. In this case, the user can perform a selection operation on a target interactive scene image in the plurality of interactive scene images, and the target interactive scene image can be displayed in the canvas area correspondingly. Therefore, the user can upload a plurality of interactive scene images at once, which is convenient for the user to edit a plurality of interactive scenes associated with an interactive content respectively, thereby improving the efficiency of interactive content generation.

In some embodiments, a display sequence of the plurality of interactive scene images is adjusted in response to a sequence arrangement operation for the plurality of interactive scene images performed by the user in the scene display area. It should be understood that interactive content usually comprises a plurality of interactive scenes. For example, an interactive lucky draw game usually comprises an introduction scene (i.e., a page introducing a lucky draw rule), a lucky draw scene (i.e., a page for a user to perform a lucky draw operation), and a lucky draw result scene (i.e., a page displaying a lucky draw result). Therefore, in the process of interactive content generation, the logical arrangement of the plurality of scenes is very important, which directly affects the user's interactive experience.

In the related art, the logical arrangement of different interactive scenes has to be completed by writing code, which is very complex and may affect the efficiency of interactive content generation. In the embodiment of the present disclosure, logical construction of an overall script of the interactive materials can be achieved by determining the display sequence of the interactive scene images. In addition, the user can perform a sequence arrangement operation on the interactive scene images in the scene display area by, for example, dragging operations, to adjust the display sequence of the plurality of interactive scene images, so as to conveniently switch between the interactive scenes of the interactive content, thereby improving the efficiency of interactive content generation.

In some embodiments, the content editing interface further comprises a timeline editing area. Correspondingly, display time and/or display effect of a material added in the target interactive scene image can be controlled in response to a timeline configuration operation for the material added in the target interactive scene image performed by the user in the timeline editing area.

Figure 4:
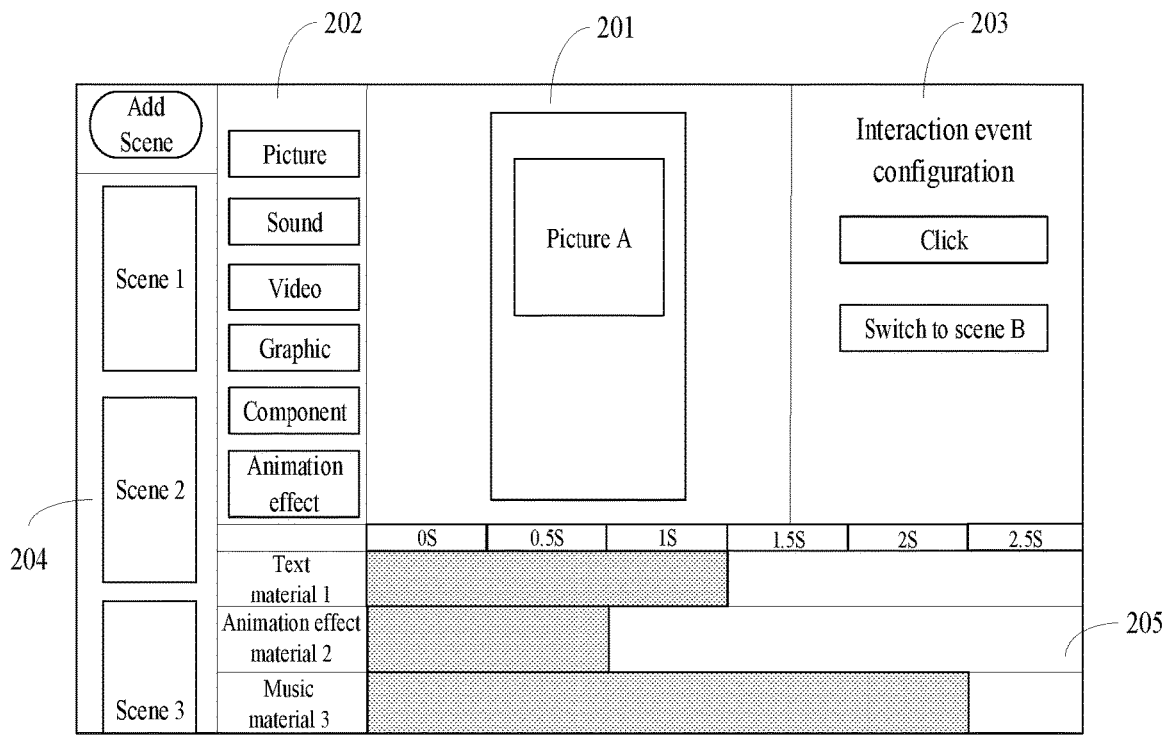
FIG. 4 is a schematic diagram of a content editing interface in an interactive content generation method according to another exemplary embodiment of the present disclosure.

For example, with reference to FIG. 4, a timeline editing area 205 may be displayed below the material area, the canvas area, and the interaction event area in the content editing interface. The timeline editing area may be divided into a first display area and a second display area. The first display area is configured to display a material added to the interactive scene image that is displayed in the canvas area and a display animation effect added to the material. The second display area is configured to configure the timeline of the added material and the display effect of the added material, for example, to display user-configured display time of the added material or a user-configured duration of the display animation effect corresponding to the added material. For example, referring to FIG. 4, a text material 1, a display animation effect 2 corresponding to the text material 1, and a music material 3 are displayed in the first display area. Correspondingly, a display time of 0 to 1 S (second) for the text material 1, a duration of 0 to 0.5 S for the display animation effect 2, and a display time of 0 to 2 S for the music material 3 can be displayed in the second display area.

In this way, the user can edit the timeline of various introduced materials such as a picture, a sound, a video, a graphic, and an animation effect through the visualized configuration operation, and strictly control the display time and display effect of each interactive material in the interactive content. This can achieve a visualized arrangement of complex interaction logic without the need for the user to generate the interactive content by writing code, thereby reducing the configuration cost in the interactive content generation process, and improving the efficiency of interactive content generation.

In some embodiments, in response to a selection operation for a target component in the target interactive scene image performed by the user, an attribute configuration interface for the target component is displayed in the interaction event area, or the content editing interface is switched to an attribute configuration interface for the target component, wherein the target component is obtained by combining and assembling a plurality of materials. Then, permission for another user to edit the target component and/or permission for another user to edit each component attribute in the target component is determined in response to an attribute configuration operation for the target component performed by the user in the attribute configuration interface.

In the embodiment of the present disclosure, after the user combines or assembles multiple materials, and sets up the appearance style, animation effect, and interaction logic, the component can be opened to another user, thereby reducing the difficulty of using a complex component. Furthermore, the user can define which materials (such as pictures, videos, etc.) of the interactive content can be edited by other users or which attributes (such as size, position, etc.) of the materials can be edited by other users by visual configuration.

As an example, in response to a selection operation for a target component in the target interactive scene image performed by the user, an attribute configuration interface for the target component can be displayed in the interaction event area, or the content editing interface can be switched to an attribute configuration interface for the target component, so that the user can define permission for another user to edit the target component and/or to permission for another user to edit each component attribute in the target component in the attribute configuration interface.

Figure 5:
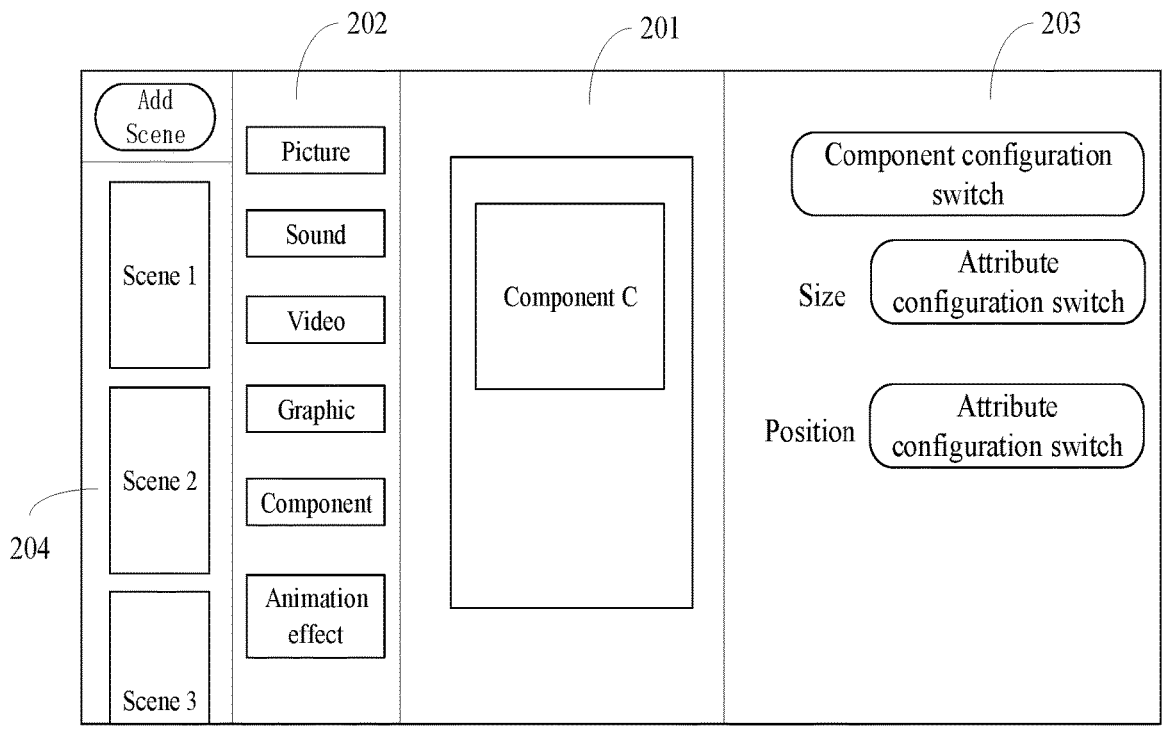
FIG. 5 is a schematic diagram of a content editing interface in an interactive content generation method according to another exemplary embodiment of the present disclosure.

For example, referring to FIG. 5, after the user selects a component C in the target interactive scene image as a target component, an attribute configuration interface corresponding to the component C can be displayed in the interaction event area. The attribute configuration interface may be provided with a component configuration switch, wherein the component configuration switch can be implemented as a control in the related art, and is not limited in the embodiment of the present disclosure. After the component configuration switch is turned on by the user through a click operation, it indicates that the user allows other users to edit the component.

After the user turns on the component configuration switch, which attributes of the component C can be edited by another user can be further configured. Similarly, an attribute configuration switch corresponding to the attribute of component C can be set to allow the user to define which attributes of the component C can be edited by another user. For example, referring to FIG. 5, attribute configuration switches corresponding to size and position are set for the component C. It should be understood that FIG. 5 is only for illustration. In specific applications, each attribute of the component can be separately provided with an attribute configuration switch for ease of use by the user.

In this case, if a target component configured by a user previously is used by another user, a component attribute that is allowed to be configured can be displayed to another user. For a component attribute that is not allowed to be configured, another user does not have permission to edit the component attribute. Therefore, full permission can be retained for the user to edit the component based on the user's definition, avoiding another user from arbitrarily editing the interactive component designed by the user.

In some embodiments, after switching from the content editing interface to the attribute configuration interface of the target component, the attribute of the target component can be configured in response to an attribute configuration operation for the target component performed by the user in the attribute configuration interface, and in response to a component save operation by the user, the target component subjected to the attribute configuration operation is saved. Then, the display is returned to the content editing interface, and the target component subjected to the attribute configuration operation is added to the material area of the content editing interface.

That is, the user can combine and assemble a plurality of materials, set up an appearance style, an animation effect, and interaction logic, and then package them into a common component for subsequent use, thus avoiding repetitive creation. For example, in the content editing interface, the plurality of materials such as pictures, sounds, videos, graphics, animation effects, etc. can be combined and their interaction logic can be defined to form a component, such as a button component, a loading component, etc. After a component is formed, i.e., after an attribute of the component is configured, the component can be saved to the material area, so that the user can add it to any creation project.

Figure 6:
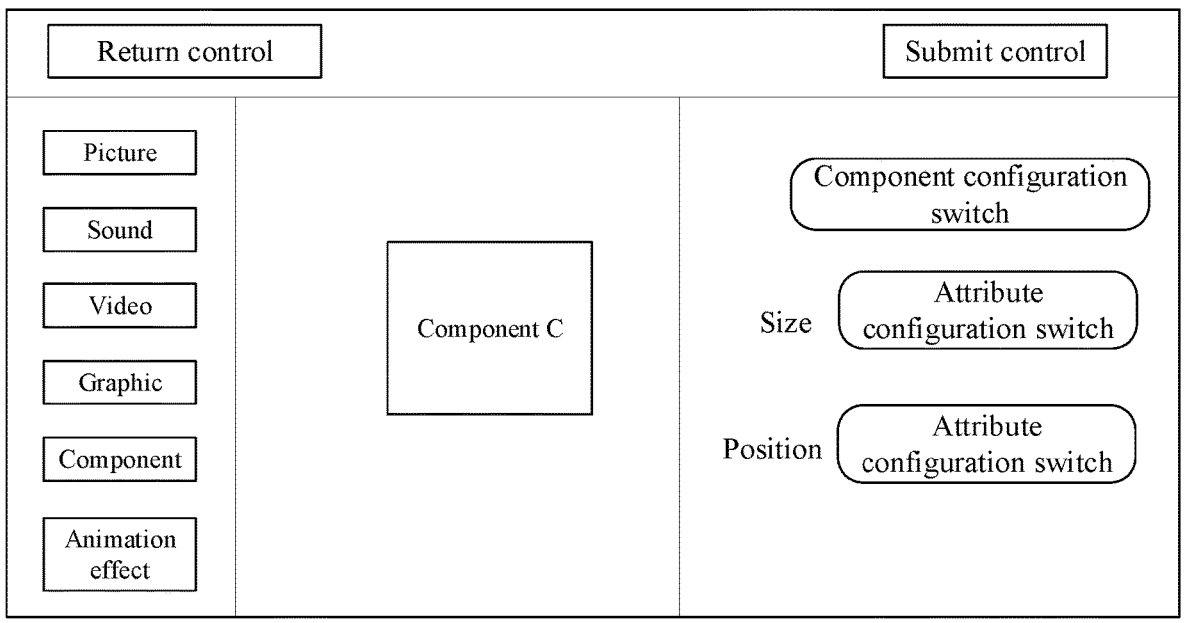
FIG. 6 is a schematic diagram of an attribute configuration interface in an interactive content generation method according to another exemplary embodiment of the present disclosure.

For example, referring to FIG. 6, the content editing interface is switched to an attribute configuration interface, wherein a component C and an attribute configuration area of the component C are displayed in the attribute configuration interface. The attribute configuration area is configured to configure permission for another user to edit the component C and/or permission for another user to edit various attributes of the component C. In addition, a submit control is also displayed in the attribute configuration interface. After the user completes the attribute configuration operation for the component C, the submit control can be triggered by a click operation or the like, that is, a component save operation is triggered by the user. Correspondingly, the component C subjected to the attribute configuration operation can be saved, and the display is automatically returned to the content editing interface, or the display is returned to the content editing interface by a user operation. For example, the user can click a return control in the attribute configuration interface to return to the content editing interface, so that the component C subjected to the attribute configuration operation can be added to the material area in the content editing interface.

Therefore, in scenarios where the same component is required, the interaction logic and style of the component can be directly reused without the need for repeated creation, improving the efficiency of interactive content generation.

In some embodiments, after the target interactive content is obtained, in response to an export operation for the target interactive content performed by the user, a material in the target interactive content is loaded and rendered according to an export device corresponding to the export operation, to make the target interactive content be adapted to and displayed on the export device.

In the related art, different types of interactive content need be generated for different launch media, systems, and models, otherwise normal interaction via the interactive content cannot take place. In an embodiment of the present disclosure, when the target interactive content is exported, the loading and rendering performance of the material contained in the target interactive content can be automatically optimized based on the export device corresponding to the export operation, thereby achieving the adaptive display of the target interactive content in the export device and reducing the situations where normal interaction cannot be carried out through the interactive content.

In addition, the target interactive content in the embodiment of the present disclosure can be automatically verified according to some launch standards. Therefore, the target interactive content generated in accordance with the embodiment of the present disclosure does not require manual performance testing and can be launched directly, thereby improving the efficiency of launching the interactive content.

Through the interactive content generation method provided in the present disclosure, visualized interactive content editing operations can be performed, and the user does not need to combine various materials by writing code to generate the interactive content. According to tests, the development cycle of interactive content can be reduced from 1 week to 2 hours. In addition, generating interactive content by writing code needs the involvement of a professional development team, while the interactive content generation method provided in the present disclosure does not require a professional development team. It can be produced by designers or junior users with a brief training, thereby reducing the production cost of interactive content. In addition, the development and maintenance process in the interactive content generation method in the related art may take from 2 days to 2 weeks. However, the interactive content generation method provided in the present disclosure can quickly adjust configuration items through visual configuration. According to tests, the configuration time can be reduced to 10-30 minutes, which can reduce the configuration cost in the interactive content generation process and improve the efficiency of interactive content generation. In addition, interactive content generated in the relevant art can only be launched after testing, which takes a time period of 2 days. According to the interactive content generation method provided in the present disclosure, generated interactive content can be launched without the need for manual testing, thereby saving testing cost.

Figure 7:
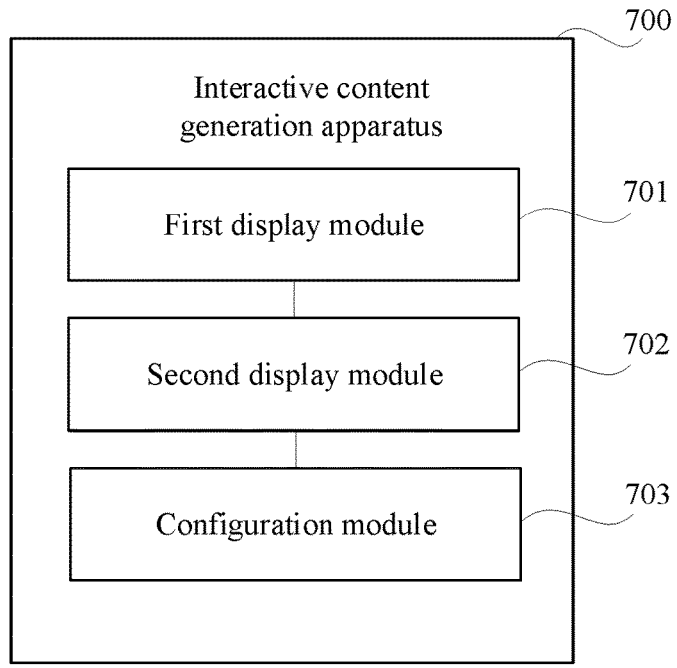
FIG. 7 is a block diagram of an interactive content generation apparatus according to an exemplary embodiment of the present disclosure.

Based on the same inventive concept, an embodiment of the present disclosure further provides an interactive content generation apparatus, wherein the apparatus can be part or all of an electronic device in the form of software, hardware, or a combination of both. Referring to FIG. 7, the interactive content generation apparatus 700 comprises a first display module 701, a second display module 702, and a configuration module 703.

The first display module 701 is configured to display a content editing interface, wherein the content editing interface comprises a canvas area, a material area, and an interaction event area, the material area being configured to display different types of preset materials, and the interaction event area being configured to configure an interaction event for a material displayed on an interactive scene image.

The second display module 702 is configured to display a target interactive scene image corresponding to a scene adding operation in the canvas area in response to the scene adding operation performed by a user in the content editing interface.

The configuration module 703 is configured to add, in response to a selection operation for a target material in the material area performed by the user, the target material to the target interactive scene image, and add, in response to an interaction event configuration operation for the target material performed by the user in the interaction event area, an interaction event to the target material to obtain target interactive content.

Optionally, the content editing interface further comprises a scene display area, and the second display module 702 is configured to: display a plurality of interactive scene images in the scene display area in response to the scene adding operation performed by the user in the content editing interface, and display the target interactive scene image in the canvas area in response to a selection operation for the target interactive scene image in the plurality of interactive scene images performed by the user.

Optionally, the apparatus 700 further comprises: an adjustment module configured to adjust a display sequence of the plurality of interactive scene images in response to a sequence arrangement operation for the plurality of interactive scene images performed by the user in the scene display area.

Optionally, the content editing interface further comprises a timeline editing area, and the apparatus 700 further comprises: a control module configured to control display time and/or display effect of a material added in the target interactive scene image in response to a timeline configuration operation for the material added in the target interactive scene image performed by the user in the timeline editing area.

Optionally, the apparatus 700 further comprises: a third display module configured to, in response to a selection operation for a target component in the target interactive scene image performed by the user, display an attribute configuration interface for the target component in the interaction event area, or switch from the content editing interface to an attribute configuration interface for the target component, wherein the target component is obtained by combining and assembling a plurality of materials; and a determination module configured to determine permission for another user to edit the target component and/or permission for another user to edit each component attribute in the target component in response to an attribute configuration operation for the target component performed by the user in the attribute configuration interface.

Optionally, the apparatus 700 further comprises: a saving module configured to, after the content editing interface is switched to the attribute configuration interface for the target component, in response to a component save operation by the user, save the target component subjected to the attribute configuration operation, return to display the content editing interface, and add the target component subjected to the attribute configuration operation to the material area of the content editing interface.

Optionally, the apparatus 700 further comprises: a rendering module configured to, after the target interactive content is obtained, in response to an export operation for the target interactive content performed by the user, load and render a material in the target interactive content according to an export device corresponding to the export operation, to make the target interactive content be adapted to and displayed on the export device.

For the apparatus described in the above embodiment, the specific ways in which the various modules of the apparatus operate have been described in detail in the embodiments of the relevant method, and will not be explained in detail here.

Based on the same inventive concept, an embodiment of the present disclosure further provides an electronic device, comprising: a storage device having a computer program stored thereon; and a processing device configured to execute the computer program in the storage device to implement the steps of any of the interactive content generation methods described above.

Figure 8:
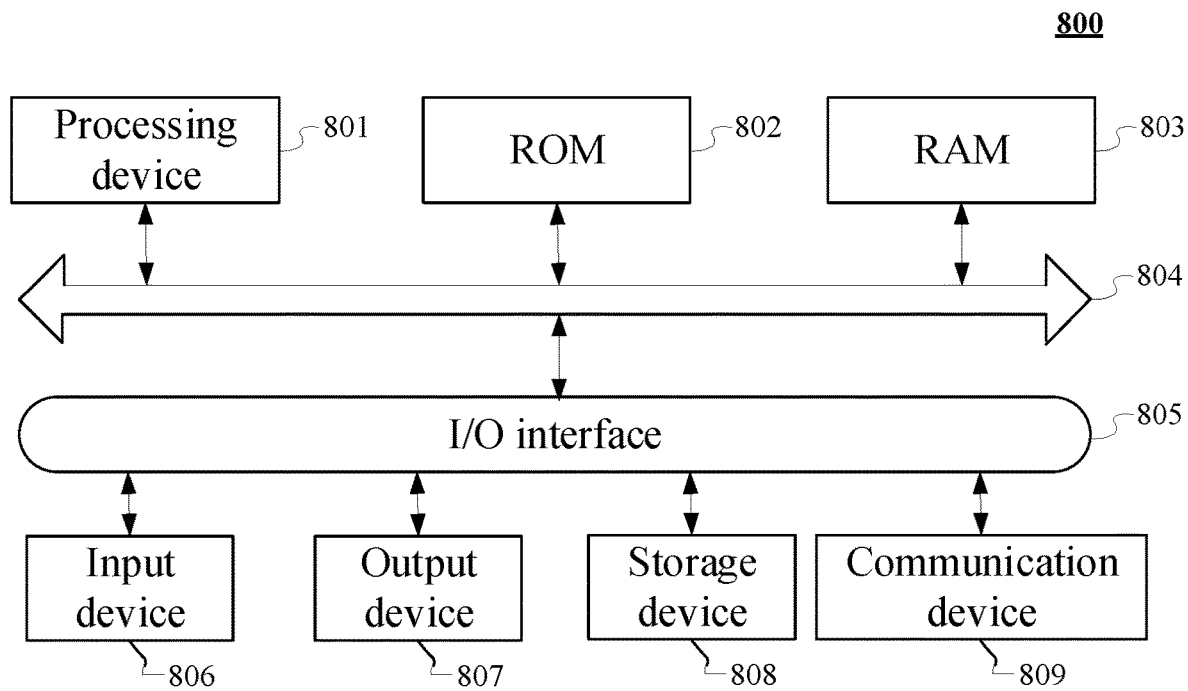
FIG. 8 is a block diagram of an electronic device according to an exemplary embodiment of the present disclosure.

Referring to FIG. 8, a structural diagram of an electronic device 800 suitable for implementing the embodiments of the present disclosure is shown. The terminal device of the embodiment of the present disclosure may comprise, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), and a fixed terminal such as a digital TV, a desktop computer, or the like. The electronic device shown in FIG. 8 is merely an example and should not impose any limitation on the function and scope of the embodiment of the present disclosure.

As shown in FIG. 8, the electronic device 800 may comprise a processing device (e.g., a central processing unit, a graphics processor, or the like) 801, which may perform various appropriate actions and processes according to a program stored in Read Only Memory (ROM) 802 or a program loaded from a storage device 808 into Random Access Memory (RAM) 803. In RAM 803, various programs and data required for the operation of the electronic device 800 are also stored. The processing device 801, ROM 802, and RAM 803 are connected to each other through a bus 804. An input/output (I/O) interface 805 is also connected to the bus 804.

Generally, the following devices can be connected to the I/O interface 805: an input device 806 comprising, for example, a touch screen, a touch pad, a keyboard, a mouse, a camera, a microphone, an accelerometer, a gyroscope, etc.; an output device 807 comprising a liquid crystal display (LCD), a speaker, a vibrator, etc.; a storage device 808 comprising, for example, a magnetic tape, a hard disk, etc.; and a communication device 809. The communication device 809 enables the electronic device 800 to communicate wirelessly or wiredly with other devices to exchange data. Although FIG. 8 shows the electronic device 800 with various components, it should be understood that it is not required to implement or have all of these components. Alternatively, more or fewer components can be implemented or provided.

In particular, according to an embodiment of the present disclosure, the processes described above with reference to the flowchart can be implemented as a computer software program. For example, an embodiment of the present disclosure comprises a computer program product, which comprises a computer program carried on a non-transitory computer readable medium, and containing program code for executing the method shown in the flowchart. In such an embodiment, the computer program may be downloaded and installed from the network through the communication device 809, or installed from the storage device 808, or from the ROM 802. When the computer program is executed by the processing device 801, the above functions defined in the method of the embodiment of the present disclosure are performed.

It should be noted that the computer-readable medium in the present disclosure may be a computer-readable signal medium or a computer-readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, wherein the program can be used by or in connection with an instruction execution system, apparatus or device. In the present disclosure, a computer readable signal medium may comprise a data signal that is propagated in the baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, comprising but not limited to wire, fiber optic cable, RF (radio frequency), etc., or any suitable combination of the foregoing.

In some embodiments, any currently known or future developed network protocol such as HTTP (HyperText Transfer Protocol) may be utilized for communication, and can be interconnected by any form or medium of digital data communication, e.g., a communication network. Examples of communication networks comprise a local area network ("LAN") and a wide area network ("WAN"), the Internet, and end-to-end networks (for example, ad hoc end-to-end networks), as well as any currently known or future developed networks.

The above computer-readable medium may be comprised in the electronic device described above; or it may exist alone without being assembled into the electronic device.

The computer-readable medium carries one or more programs that, when executed by the electronic device, cause the electronic device to: display a content editing interface, wherein the content editing interface comprises a canvas area, a material area, and an interaction event area, the material area being configured to display different types of preset materials, and the interaction event area being configured to configure an interaction event for a material displayed on an interactive scene image; display a target interactive scene image corresponding to a scene adding operation in the canvas area in response to the scene adding operation performed by a user in the content editing interface; and add, in response to a selection operation for a target material in the material area performed by the user, the target material to the target interactive scene image, and add, in response to an interaction event configuration operation for the target material performed by the user in the interaction event area, an interaction event to the target material to obtain target interactive content.

The computer program code for executing operations of the present disclosure may be written in one or more program design languages or combinations thereof, the program design languages comprising, but being not limited to, object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the circumstance involving the remote computer, the remote computer may be connected to the user computer through various kinds of networks, comprising a local area network (LAN) or a wide area network (WAN), or connected to an external computer (for example, through an Internet connection provided by an Internet service provider).

The flowcharts and block diagrams in the accompanying drawings illustrate the architecture, functionality, and operation of some possible implementations of systems, methods and computer program products in accordance with various embodiments of the present disclosure. In this regard, each block in the flowchart or block diagrams may represent a module, program segment, or portion of code, wherein the module, program segment, or portion of code comprises one or more executable instructions for implementing the specified logical function. It should also be noted that, in some alternative implementations, the functions noted in the block may also occur in a different order than those noted in the accompanying drawings. For example, two blocks shown in succession may be executed substantially in parallel, or the blocks may sometimes be executed in the reverse order, depending upon the functionality involved. It will also be noted that each block of the block diagrams and/or flowchart illustration, and combinations of blocks in the block diagrams and/or flowchart t illustration, can be implemented by special purpose hardware-based systems that perform the specified functions or operations, or combinations of special purpose hardware and computer instructions.

The modules involved in the embodiments described in the present disclosure can be implemented in software or hardware. Names of the modules do not constitute a limitation on the modules themselves under certain circumstances.

The functions described above may be performed at least in part by one or more hardware logic components. For example, without limitation, exemplary types of hardware logic components that can be used comprise: a Field Programmable Gate Array (FPGA), an Application Specific Integrated Circuit (ASIC), an Application Specific Standard Product (ASSP), a System on Chip (SOC), a Complex Programmable Logic Device (CPLD), etc.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of thereof. More specific examples of the machine-readable storage medium may comprise electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

According to one or more embodiments of the present disclosure, Example 1 provides an interactive content generation method, comprising: displaying a content editing interface, wherein the content editing interface comprises a canvas area, a material area, and an interaction event area, the material area being configured to display different types of preset materials, and the interaction event area being configured to configure an interaction event for a material displayed on an interactive scene image; displaying a target interactive scene image corresponding to a scene adding operation in the canvas area in response to the scene adding operation performed by a user in the content editing interface; and adding, in response to a selection operation for a target material in the material area performed by the user, the target material to the target interactive scene image, and adding, in response to an interaction event configuration operation for the target material performed by the user in the interaction event area, an interaction event to the target material to obtain target interactive content.

According to one or more embodiments of the present disclosure, Example 2 provides the method of Example 1, wherein: the content editing interface further comprises a scene display area; and the displaying of the target interactive scene image corresponding to the scene adding operation in the canvas area in response to the scene adding operation performed by the user in the content editing interface comprises: displaying a plurality of interactive scene images in the scene display area in response to the scene adding operation performed by the user in the content editing interface, and displaying the target interactive scene image in the canvas area in response to a selection operation for the target interactive scene image in the plurality of interactive scene images performed by the user.

According to one or more embodiments of the present disclosure, Example 3 provides the method of Example 2, wherein the method further comprises: adjusting a display sequence of the plurality of interactive scene images in response to a sequence arrangement operation for the plurality of interactive scene images performed by the user in the scene display area.

According to one or more embodiments of the present disclosure, Example 4 provides the method of any one of Example 1 to Example 3, wherein the content editing interface further comprises a timeline editing area; and the method further comprises: controlling display time and/or display effect of a material added in the target interactive scene image in response to a timeline configuration operation for the material added in the target interactive scene image performed by the user in the timeline editing area.

According to one or more embodiments of the present disclosure, Example 5 provides the method of any one of Example 1 to Example 3, wherein the method further comprises: in response to a selection operation for a target component in the target interactive scene image performed by the user, displaying an attribute configuration interface for the target component in the interaction event area, or switching from the content editing interface to an attribute configuration interface for the target component, wherein the target component is obtained by combining and assembling a plurality of materials; and determining permission for another user to edit the target component and/or permission for another user to edit each component attribute in the target component in response to an attribute configuration operation for the target component performed by the user in the attribute configuration interface.

According to one or more embodiments of the present disclosure, Example 6 provides the method of Example 5, wherein the method further comprises: after switching from the content editing interface to the attribute configuration interface for the target component, in response to a component save operation by the user, saving the target component subjected to the attribute configuration operation, returning to display the content editing interface, and adding the target component subjected to the attribute configuration operation to the material area of the content editing interface.

According to one or more embodiments of the present disclosure, Example 7 provides the method of any one of Example 1 to Example 3, wherein the method further comprises: after obtaining the target interactive content, in response to an export operation for the target interactive content performed by the user, loading and rendering a material in the target interactive content according to an export device corresponding to the export operation, to make the target interactive content be adapted to and displayed on the export device.

According to one or more embodiments of the present disclosure, Example 8 provides an interactive content generation apparatus, comprising: a first display module configured to display a content editing interface, wherein the content editing interface comprises a canvas area, a material area, and an interaction event area, the material area being configured to display different types of preset materials, and the interaction event area being configured to configure an interaction event for a material displayed on an interactive scene image; a second display module configured to display a target interactive scene image corresponding to a scene adding operation in the canvas area in response to the scene adding operation performed by a user in the content editing interface; and a configuration module configured to add, in response to a selection operation for a target material in the material area performed by the user, the target material to the target interactive scene image, and add, in response to an interaction event configuration operation for the target material performed by the user in the interaction event area, an interaction event to the target material to obtain target interactive content.

According to one or more embodiments of the present disclosure, Example 9 provides a non-transitory computer-readable medium having a computer program stored thereon, wherein the computer program, when executed by a processing device, implements the method described in any one of Example 1 to Example 7.

According to one or more embodiments of the present disclosure, Example 10 provides an electronic device, comprising: a storage device having a computer program stored thereon; and a processing device configured to execute the computer program in the storage device to implement the method described in any one of Example 1 to Example 7.

According to one or more embodiments of the present disclosure, Example 11 provides a computer program, comprising: instructions that, when executed by a processor, cause the processor to perform the method described in any one of Example 1 to Example 7.

According to one or more embodiments of the present disclosure, Example 12 provides a computer program product comprising instructions that, when executed by a processor, cause the processor to perform the method described in any one of Example 1 to Example 7.

The above description is only preferred embodiments of the present disclosure and an explanation of the applied technical principles. Those skilled in the art should understand that the scope of disclosure involved in the present disclosure is not limited to the technical solutions formed by the specific combination of the above technical features, and should also cover other technical solutions formed by any combination of the above technical features or their equivalent features without departing from the disclosed concept, for example, technical solutions formed by replacing the above features with technical features having similar functions to (but not limited to) those disclosed in the present disclosure.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are comprised in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims. For the apparatus described in the above embodiment, the specific ways in which the various modules operate have been described in detail in the embodiments of the relevant method, and will not be explained in detail here.

What is claimed is:

1. An interactive content generation method, comprising:
displaying a content editing interface, wherein the content editing interface comprises a canvas area, a material area, and an interaction event area, the material area being configured to display different types of preset materials, and the interaction event area being configured to configure an interaction event for a material displayed on an interactive scene image;
displaying a target interactive scene image corresponding to a scene adding operation in the canvas area in response to the scene adding operation performed by a user in the content editing interface; and
adding, in response to a selection operation for a target material in the material area performed by the user, the target material to the target interactive scene image, and adding, in response to an interaction event configuration operation for the target material performed by the user in the interaction event area, an interaction event to the target material to obtain target interactive content.

2. The interactive content generation method according to claim 1, wherein:
the content editing interface further comprises a scene display area; and
the displaying of the target interactive scene image corresponding to the scene adding operation in the canvas area in response to the scene adding operation performed by the user in the content editing interface comprises:
displaying a plurality of interactive scene images in the scene display area in response to the scene adding operation performed by the user in the content editing interface, and displaying the target interactive scene image in the canvas area in response to a selection operation for the target interactive scene image in the plurality of interactive scene images performed by the user.

3. The interactive content generation method according to claim 2, further comprising:
adjusting a display sequence of the plurality of interactive scene images in response to a sequence arrangement operation for the plurality of interactive scene images performed by the user in the scene display area.

4. The interactive content generation method according to claim 1, wherein:

the content editing interface further comprises a timeline editing area; and the interactive content generation method further comprises:

controlling display time and/or display effect of a material added in the target interactive scene image in response to a timeline configuration operation for the material added in the target interactive scene image performed by the user in the timeline editing area.

5. The interactive content generation method according to claim 1, further comprising:

in response to a selection operation for a target component in the target interactive scene image performed by the user, displaying an attribute configuration interface for the target component in the interaction event area, or switching from the content editing interface to an attribute configuration interface for the target component, wherein the target component is obtained by combining and assembling a plurality of materials; and determining permission for another user to edit the target component and/or permission for another user to edit each component attribute in the target component in response to an attribute configuration operation for the target component performed by the user in the attribute configuration interface.

6. The interactive content generation method according to claim 5, further comprising:

after switching from the content editing interface to the attribute configuration interface for the target component, in response to a component save operation by the user, saving the target component subjected to the attribute configuration operation, returning to display the content editing interface, and adding the target component subjected to the attribute configuration operation to the material area of the content editing interface.

7. The interactive content generation method according to claim 1, further comprising:

after obtaining the target interactive content, in response to an export operation for the target interactive content performed by the user, loading and rendering a material in the target interactive content according to an export device corresponding to the export operation, to make the target interactive content be adapted to and displayed on the export device.

8. A non-transitory computer-readable medium having a computer program stored thereon, wherein the computer program, when executed by a processing device, causes the processing device to:

display a content editing interface, wherein the content editing interface comprises a canvas area, a material area, and an interaction event area, the material area being configured to display different types of preset materials, and the interaction event area being configured to configure an interaction event for a material displayed on an interactive scene image;

display a target interactive scene image corresponding to a scene adding operation in the canvas area in response to the scene adding operation performed by a user in the content editing interface; and add, in response to a selection operation for a target material in the material area performed by the user, the target material to the target interactive scene image, and add, in response to an interaction event configuration operation for the target material performed by the user in the interaction event area, an interaction event to the target material to obtain target interactive content.

9. The non-transitory computer-readable medium according to claim 8, wherein:

the content editing interface further comprises a scene display area; and the computer program, when executed by the processing device, causes the processing device to display a plurality of interactive scene images in the scene display area in response to the scene adding operation performed by the user in the content editing interface, and display the target interactive scene image in the canvas area in response to a selection operation for the target interactive scene image in the plurality of interactive scene images performed by the user.

10. The non-transitory computer-readable medium according to claim 9, wherein the computer program, when executed by the processing device, further causes the processing device to adjust a display sequence of the plurality of interactive scene images in response to a sequence arrangement operation for the plurality of interactive scene images performed by the user in the scene display area.

11. The non-transitory computer-readable medium according to claim 8, wherein:

the content editing interface further comprises a timeline editing area; and the computer program, when executed by the processing device, further causes the processing device to control display time and/or display effect of a material added in the target interactive scene image in response to a timeline configuration operation for the material added in the target interactive scene image performed by the user in the timeline editing area.

12. The non-transitory computer-readable medium according to claim 8, wherein the computer program, when executed by the processing device, further causes the processing device to:

in response to a selection operation for a target component in the target interactive scene image performed by the user, display an attribute configuration interface for the target component in the interaction event area, or switch from the content editing interface to an attribute configuration interface for the target component, wherein the target component is obtained by combining and assembling a plurality of materials; and determine permission for another user to edit the target component and/or permission for another user to edit each component attribute in the target component in response to an attribute configuration operation for the target component performed by the user in the attribute configuration interface.

13. The non-transitory computer-readable medium according to claim 12, wherein the computer program, when executed by the processing device, further causes the processing device to:

after switching from the content editing interface to the attribute configuration interface for the target component, in response to a component save operation by the user, save the target component subjected to the attribute configuration operation, return to display the content editing interface, and add the target component subjected to the attribute configuration operation to the material area of the content editing interface.

14. The non-transitory computer-readable medium according to claim 8, wherein the computer program, when executed by the processing device, further causes the processing device to:

after obtaining the target interactive content, in response to an export operation for the target interactive content performed by the user, load and render a material in the target interactive content according to an export device corresponding to the export operation, to make the target interactive content be adapted to and displayed on the export device.

15. An electronic device, comprising:
a storage device having a computer program stored thereon; and
a processing device configured to execute the computer program in the storage device to;
display a content editing interface, wherein the content editing interface comprises a canvas area, a material area, and an interaction event area, the material area being configured to display different types of preset materials, and the interaction event area being configured to configure an interaction event for a material displayed on an interactive scene image;
display a target interactive scene image corresponding to a scene adding operation in the canvas area in response to the scene adding operation performed by a user in the content editing interface; and
add, in response to a selection operation for a target material in the material area performed by the user, the target material to the target interactive scene image, and add, in response to an interaction event configuration operation for the target material performed by the user in the interaction event area, an interaction event to the target material to obtain target interactive content.

16. The electronic device according to claim 15, wherein:
the content editing interface further comprises a scene display area; and
the processing device is configured to execute the computer program in the storage device to:
display a plurality of interactive scene images in the scene display area in response to the scene adding operation performed by the user in the content editing interface, and display the target interactive scene image in the canvas area in response to a selection operation for the target interactive scene image in the plurality of interactive scene images performed by the user.

17. The electronic device according to claim 16, wherein the processing device is further configured to execute the computer program in the storage device to adjust a display sequence of the plurality of interactive scene images in response to a sequence arrangement operation for the plurality of interactive scene images performed by the user in the scene display area.

18. The electronic device according to claim 15, wherein:
the content editing interface further comprises a timeline editing area; and
the processing device is further configured to execute the computer program in the storage device to control display time and/or display effect of a material added in the target interactive scene image in response to a timeline configuration operation for the material added in the target interactive scene image performed by the user in the timeline editing area.

19. The electronic device according to claim 15, wherein the processing device is further configured to execute the computer program in the storage device to:
in response to a selection operation for a target component in the target interactive scene image performed by the user, display an attribute configuration interface for the target component in the interaction event area, or switch from the content editing interface to an attribute configuration interface for the target component, wherein the target component is obtained by combining and assembling a plurality of materials; and
determine permission for another user to edit the target component and/or permission for another user to edit each component attribute in the target component in response to an attribute configuration operation for the target component performed by the user in the attribute configuration interface.

20. The electronic device according to claim 19, wherein the processing device is further configured to execute the computer program in the storage device to:
after switching from the content editing interface to the attribute configuration interface for the target component, in response to a component save operation by the user, save the target component subjected to the attribute configuration operation, return to display the content editing interface, and add the target component subjected to the attribute configuration operation to the material area of the content editing interface.

* * * * *